United States Patent [19]

Katagi

[11] 4,127,873
[45] Nov. 28, 1978

[54] IMAGE RESOLUTION ENHANCEMENT METHOD AND APPARATUS

[75] Inventor: Kazuo Katagi, Woodland Hills, Calif.

[73] Assignee: RCA Corporation, Princeton, N.J.

[21] Appl. No.: 799,079

[22] Filed: May 20, 1977

[51] Int. Cl.² .............................................. H04N 5/14
[52] U.S. Cl. .................................... 358/166; 358/138; 358/242
[58] Field of Search ............... 358/160, 166, 230, 240, 358/241, 242, 880, 133, 260, 138

[56] References Cited

U.S. PATENT DOCUMENTS

| 2,921,124 | 1/1960 | Graham | 358/138 |
| 3,474,445 | 10/1969 | Redman | 358/242 |

Primary Examiner—Richard Murray

Attorney, Agent, or Firm—H. Christoffersen; Joseph D. Lazar; Raymond E. Smiley

[57] ABSTRACT

A frame of information to be displayed in the form of a row and column matrix of display elements is created from a corresponding group of data cells stored functionally in the form of a row and column matrix where the number of rows and columns in the stored matrix is less than the number of rows and columns in the displayed matrix. The value of each display element is determined by obtaining the average of the values of the data cells with which the display elements immediately adjacent the display element, the value of which is to be determined, correspond summed with $n$ times the value of the data cell corresponding to the display element, the value of which is to be determined, where $n$ is an integer greater than one.

10 Claims, 17 Drawing Figures

FIRST FIELD (TF 72 = 0)

COLUMN  ROW
0   1

SECOND FIELD (TF 72 = 1)

COLUMN  ROW
0   1

FIRST FIELD

| LEGEND | TIME → | | | | | |
|---|---|---|---|---|---|---|
| CL | ⌐ 0 | ⌐ 200 | ⌐ 400 | ⌐ 600 | ⌐ 800 | ⌐ 1000 |
| 26 | $D_{0-0}$ | $D_{0-0}$ | $D_{0-1}$ | $D_{0-1}$ | $D_{0-2}$ | $D_{0-2}$ |
| 28 | $D_{1-0}$ | $D_{1-0}$ | $D_{1-1}$ | $D_{1-1}$ | $D_{1-2}$ | $D_{1-2}$ |
| 34(C) | $D_{0-0}$ | $D_{0-0}$ | $D_{0-1}$ | $D_{0-1}$ | $D_{0-2}$ | $D_{0-2}$ |
| 36(A) | — | — | $D_{0-0}$ | $D_{0-0}$ | $D_{0-1}$ | $D_{0-1}$ |
| 30(B) | — | $D_{0-0}$ | $D_{0-0}$ | $D_{0-1}$ | $D_{0-1}$ | $D_{0-2}$ |
| 32(D) | — | $D_{1-0}$ | $D_{1-0}$ | $D_{1-1}$ | $D_{1-1}$ | $D_{1-2}$ |

*Fig. 5a.*

SECOND FIELD

| LEGEND | TIME → | | | | | |
|---|---|---|---|---|---|---|
| CL | ⌐ 0 | ⌐ 200 | ⌐ 400 | ⌐ 600 | ⌐ 800 | ⌐ 1000 |
| 26 | $D_{0-0}$ | $D_{0-0}$ | $D_{0-1}$ | $D_{0-1}$ | $D_{0-2}$ | $D_{0-2}$ |
| 28 | $D_{1-0}$ | $D_{1-0}$ | $D_{1-1}$ | $D_{1-1}$ | $D_{1-2}$ | $D_{1-2}$ |
| 34(C) | $D_{1-0}$ | $D_{1-0}$ | $D_{1-1}$ | $D_{1-1}$ | $D_{1-2}$ | $D_{1-2}$ |
| 36(A) | — | — | $D_{1-0}$ | $D_{1-0}$ | $D_{1-1}$ | $D_{1-1}$ |
| 30(B) | — | $D_{0-0}$ | $D_{0-0}$ | $D_{0-1}$ | $D_{0-1}$ | $D_{0-2}$ |
| 32(D) | — | $D_{1-0}$ | $D_{1-0}$ | $D_{1-1}$ | $D_{1-1}$ | $D_{1-2}$ |

COLUMN  ROW

| 0 | 1 |
|---|---|
|   |   | 1
| G | C | H |
| B | E | D |
| F | A | I | 0

*Fig. 8a.*
(400 ns)

COLUMN  ROW

| 0 | 1 |
|---|---|
|   |   | 1
| G | C | H |
| B | E | D |
| F | A | I | 0

*Fig. 8c.*
(400 ns)

| 0 | 1 |
|---|---|
| G | C | H |
| B | E | D |
| F | A | I | 1
|   |   | 0

*Fig. 8b.*
(600 ns)

| 0 | 1 |
|---|---|
| G | C | H |
| B | E | D |
| F | A | I | 1
|   |   | 0

*Fig. 8d*
(600 ns)

IMAGE RESOLUTION ENHANCEMENT METHOD AND APPARATUS

BACKGROUND OF THE INVENTION

In systems which display digitally stored information it is often desirable to display information with relatively great resolution for providing pleasing representation while storing only a relatively small amount of information to save memory cost, size, weight and power.

U.S. Pat. No. 3,573,789 describes a method of computing the value of and displaying more elements than are stored where each element is one of only two values. For a practical implementation the therein disclosed method requires three successive columns of stored information to be available concurrently requiring a relatively large amount of structure even when each element can only assume two states. In a system where elements can assume more than two states i.e., a multibit or grey scale system the cost of the structure for storing three columns of information becomes even higher, more bulky and consumes more power than for a two value system.

SUMMARY OF THE INVENTION

Apparatus for displaying, in response to digital signals representing data cells, variable intensity display elements in a matrix of rows and columns where the signals representing the data cells are derived from a data image defined by a matrix of rows and columns of the data cells, each of the cells having a discrete value of a plurality greater than two, includes means generating a first signal representing the value of a particular data cell and second signals representing respectively the values of selected ones of data cells adjacent the one particular data cell. Also included is means responsive to the first and second signals for generating a third signal which is the average of $n$ times the value of the one particular data cell and not greater than $n-1$ times the value of each of the adjacent selected data cells, where $n$ is either 2 or 3 as determined by the number of selected data cells. A display means is provided which is responsive to the third signal for intensity modulating its display surface at an intensity corresponding to the third signal.

A method for increasing the resolution of a system for displaying images which are stored as a data image comprising a maxtrix of rows and columns of data cells each of which is one of a fixed plurality of discrete values and represents an area of physical image to be displayed includes three steps. The first step is computing the averages of $n$ times the value of each data cell and one of each of the four combinations of the value of one adjacent row data cell and one adjacent column data cell and each of the four combinations of two times the value of one adjacent row data cell, two times the value of one adjacent column data cell and the value of the data cell in the same column as the row adjacent data cell and in the same row as the column adjacent data cell, where $n$ is the integer of the number of adjacent data cells the average of which is computed. The second step is partitioning each of the areas of said physical image representing each data cell into four quadrantal sections each having an edge adjacent an area represented by an adjacent column data cell and an edge adjacent an area represented by an adjacent row data cell. The third step is displaying each of the four quadrantal sections of said areas of said physical image as a function of said average value computed with the adjacent row and column data cells representing areas of physical image adjacent respective row and column edges of each quadrantal section.

DETAILED DESCRIPTION OF THE PREFERRED EMBODIMENT

Figure 1:
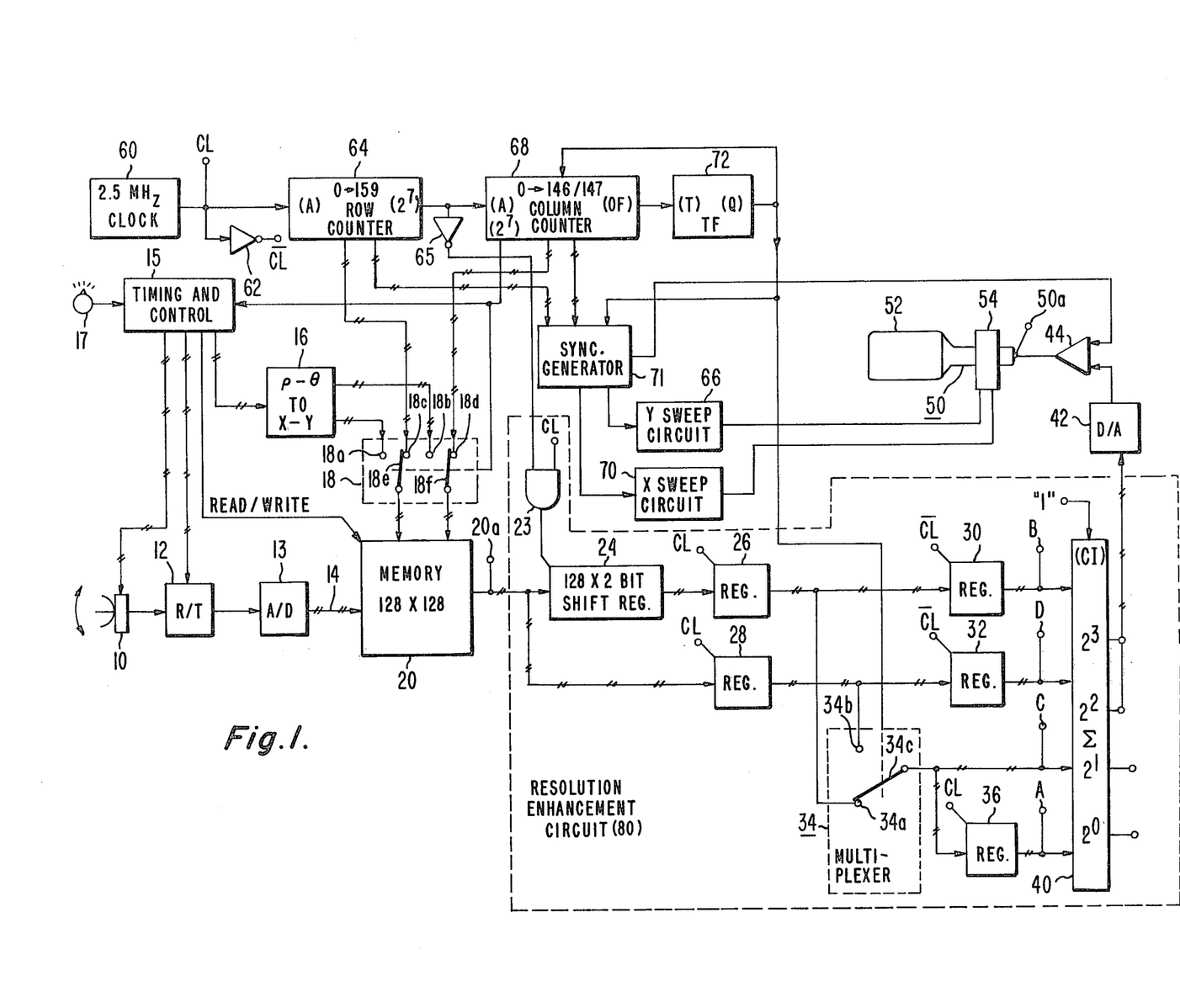
FIG. 1 is a schematic diagram of a digital weather radar employing a display screen of the present invention utilizing an interlaced frame of information.

In FIG. 1 a digital airborne weather radar is shown including a sector scan transmitting and receiving antenna 10, a receiver/transmitter (RT) 12 and an analog-to-digital converter (AD) 13 all of conventional design and operation. Antenna 10 and RT 12 may, for example, be of the type exemplified by the model PriMUS 40 manufactured and sold by the RCA Corporation Van Nuys, California. A timing and control circuit (TC) 15 is coupled to a control input terminal of each of antenna 10, RT 12 and rho-theta to X-Y converter 16 (of which more will be said later). A rotatable switch 17 coupled to TC 15 is set by the radar operator to indicate the maximum range of interest to the operator. Components 10, 12, 13, 15 and 17 operate together to produce, serially, at multiconducting cable 14 (all multiconductor cables such as 14 are so indicated by slash marks) multibit signals representing radar return amplitudes serially at successive range positions (distances) from antenna 10 at a given angle or azimuth position and then serially at successive range positions at an adjacent azimuth position, etc.

Typical maximum ranges are from a few miles to a few hundred miles as determined by the setting of switch 17. Typical sectors of azimuth positions are from 90° to 180°. Such a format is commonly called a rho-theta format or Plan Position Indicator (PPI) format. Thus, for example, AD 13 may produce a succession of two bit signals, each representing one of four different levels of meteorological conditions ranging from a clear sky to a dense storm cloud, at successive ranges from antenna 10.

Some digital radar systems employ a cathode ray tube (CRT) display which presents information in the aforementioned rho-theta format. That is, the presentation appears as spokes of a wheel radiating from a common origin representing the position of antenna 10. In the present exemplary radar system, however, the presentation is in the form of a raster scan (i.e., parallel lines of information) each line containing a plurality of display elements.

Accordingly, cable 14 is coupled to the information lines of memory device 20 while converter 16 is coupled to the X and Y address lines thereof via terminals 18a and 18b of multiplexer 18. Since TC 15 generates command signals to position antenna 10, it continually tracks the angular position of the antenna. Further since TC 15 generates radar transmitter pulses via RT 12 to antenna 10 and since the propagation rate of radar waves in free space is known, TC 15 continually tracks the radial distance from antenna 10 from which return signals to the antenna have come. Thus, TC 15 continually tracks the range and azimuth from which signals appearing on line 14 have come. Therefore, converter 16, under control of TC 15, converts the coordinates of each digital signal emitting from AD 13 at a given azimuth or angle and at a given distance therealong from the antenna 10 to the equivalent horizontal (X) and vertical (Y) distances from some reference point thereby providing a storage address location to memory 20. Any one of a number of conventional converters 16 may be employed.

Memory 20 may store data received from AD 13 functionally in the form of a two dimensional matrix of rows and columns of information termed data cells. There may be, for example, capacity for 128 columns of data cells each column consisting of 128 data cells arranged in 128 rows which will, in a manner hereinafter to be described, provide the basis of one frame of information to be displayed on a display device 50. Each data cell is at one of at least three values. For example, if the value of data cells are stored in binary form, storage of 2 bits per data cell permits each data cell to be one of 4 values. It will be appreciated by those knowledgeable with various types of suitable memories 20 that the actual storage may not be in the form of rows and columns but for purposes of description of the apparatus of FIG. 1 storage in the form of successively numbered columns and rows will be assumed.

Terminals 20a of memory 20 are coupled to a shift register 24 capable of holding signals representing one entire column of information therefrom and to a register 28 capable of holding signals representing a single data cell. Thus, for example, shift register 24 stores signals representing 128 two bit data cells. Shift register 24 is located within a dashed block 80 and along with the other components located therein comprises a "resolution enhancement circuit".

Shift register 24 is coupled to a single data cell register 26. Register 26 is coupled to a similar register 30 and to one pole 34a of a multiplexer 34 illustrated schematically as an electrically controlled two position switch. Register 28 is coupled to a similar register 32 and to a second pole 34b of multiplexer 34.

Registers 30, 32, a common pole 34c of multiplexer 34 and single cell register 36, which is also coupled to pole 34c, are coupled to terminals B, D, C and A respectively of a summing device 40. For the exemplary two bit data cells representing decimal values from 0 to 3, a 4 bit summing device 40 is adequate since the sum of the values of four input signals, none of which exceed the digital value 3, cannot exceed the decimal value 12 and the decimal value 12 can be expressed by four binary bits.

A signal representing the value 1 is coupled to the carry in (CI) input terminal of summing means 40 for the purpose of adding the value 1 to the value of signals received from elements 30, 32, 34 and 36. The two lower order output terminals, $2^0$ and $2^2$, of summing device 40 are left open circuited while the two higher order output terminals, $2^2$ and $2^3$, are coupled to the digital-to-analog converter (DA) 42. This arrangement causes the values represented by the signals applied to terminals A, B, C and D to be summed, added to one and the result divided by 4. As the outputs from the $2^0$ and $2^1$ terminals are not utilized only the integer of the computed number is utilized. DA converter 42 converts the integer value thus obtained to an analog signal representing the digital signal applied to it. DA 42 is coupled to amplifier 44 which amplifies input signals to signals having appropriate parameters for application to the video input terminal 50a of display device 50. Display device 50 may typically be a CRT of the type used in television receivers and may have a suitable viewing screen 52 on which lines of information are traced by an electron beam (not shown) at positions on viewing screen 52 determined by signals applied to deflection yoke means 54. Deflection yoke 54 may be of conventional design. The luminance of points along each line of information are determined in accordance with signals applied at terminal 50a. In accordance with one exemplary radar, sweep lines extend vertically from bottom to top of screen 52 and successive scan lines are traced to the right of preceeding sweep lines. There are two such fields of interlaced scan lines in one frame as in a conventional television set.

In the upper left corner of FIG. 1 is a source 60 of clock signals which control the timing of movement of data through the system of FIG. 1 at such a rate as to provide a flicker free display on viewing screen 52. In one exemplary embodiment, clock source 60 provides pulses of 50% duty cycle having a frequency of 2.5 MHz (thus having a period of 400 nanoseconds). Clock source 60 produces, at the terminal designated CL, relatively high or logic one pulses 200 nanoseconds in duration alternating with relatively low or logic zero pulses also of 200 nanoseconds duration. An inverter 62 coupled to the CL terminal produces signals at the terminal designated $\overline{CL}$ inverted from those produced of terminal CL.

Terminal CL is coupled to terminals identified by the same designation in AND gate 23, the output terminal of which is coupled to the clocking terminal of shift register 24, and to registers 26, 28 and 36 for controlling the movement of data representing signals into and through those registers. Similarly the $\overline{CL}$ terminal from inverter 62 is coupled to terminals identified by the same designation in registers 30 and 32 for controlling the movement of data into those registers. The CL signals are also coupled to the advance (A) terminal of 8 stage binary counter 64 which advances by 1 for each logic one pulse received at the A terminal.

The counts in counter 64 range from 0 through 159. Counter 64, designated a row counter, is coupled through terminal 18c of multiplexer 18 to memory 20 for addressing successive rows of data cells stored therein. The $2^7$ output terminals of counter 64 which is at a logic 1 when counter 64 is at a count of 128 or more is coupled to the A terminal of column counter 68, similar to counter 64, and via inverter 65 to the second terminal of AND gate 23. The counts in counter 68 range from 0 through 146 every other cycle and 0 through 147 on the remaining cycles.

Counter 68 is coupled via respective output lines to TC 15, to multiplexer 18 to control the setting of switch arms 18e and 18f thereof and to memory 20 via terminal 18d of multiplexer 18 for addressing successive columns of data cells stored therein. Thus, for example, with row counter 64 at a count of 10 and column counter 68 at a count of 25, the two bit data cell at column 25 row 10 will be presented at terminal 20a of memory 20. It should be noted that if memory 20 is of the type which simply emits signals upon command representing the next data cell such as would be the case with a shift register, there need be no connection between counters 64 and 68 and memory 20. Rather clock source 60 may be coupled directly to memory 20 for serially shifting signals representing data cells at successive row points along a column, and then at successive columns, to terminal 20a.

Returning to counter 68 it has a terminal OF coupled to the toggle (T) terminal of a toggle flop 72. A logic one signal is generated at the OF terminal of each of counter 68 when 1.) it is at a last count (146 or 147) and 2.) a logic one signal is received at the A terminal thereof to "advance" the counter from the last count to a count of 0. A logic one signal appearing at the T input of TF 72 causes its Q output terminal to change from whatever logic state it is at (logic 1 or logic 0) to the other logic state. The Q output terminal of toggle flop 72 is coupled to multiplexer 34 to control the movement of switch arm 34c and to counter 68 to control its maximum count such that when the Q output of TF 72 is at logic 1, counter 68 counts to a count of 147 while when the Q output is a logic 0 counter 68 counts to a count of 146.

Row counter 64, column counter 68 and flip flop 72 are coupled to synchronization generator 71. Sync. generator 71 transmits a synchronization pulse to each of sweep circuits 66 and 70 at appropriate times. Row counts of 128 through 159 correspond to Y (vertical) sweep flyback time and column counts 128 through 146 or 147 correspond to X (horizontal) sweep flyback time. Sync. generator 71 is also coupled to video amplifier 44 to blank video during sweep flyback time. The column counter 68 counts to 146 or 147 under control of TF 72 alternatively to provide interlaced sweep on alternate fields. When toggle flop 72 is set, the sweep lines are offset to right to interlace with the sweep lines of previous fields. Y sweep circuit 66 is coupled to the Y deflection coil of deflection yoke 54 while X sweep circuit 70 is coupled to the X deflection coil of yoke 54. Since counters 64 and 68 control timing in sync. generator 71 and since it controls timing of sweep signals from sweep circuits 66 and 70, increasing counts during the first 128 counts (counts 0-127) in counter 64 correspond to increasing deflection from bottom to top on viewing screen 52 of the electron beam (not shown) applied thereto while increasing counts during the first 128 counts in counter 68 correspond to deflection from left to right on viewing screen 52.

Figure 2:
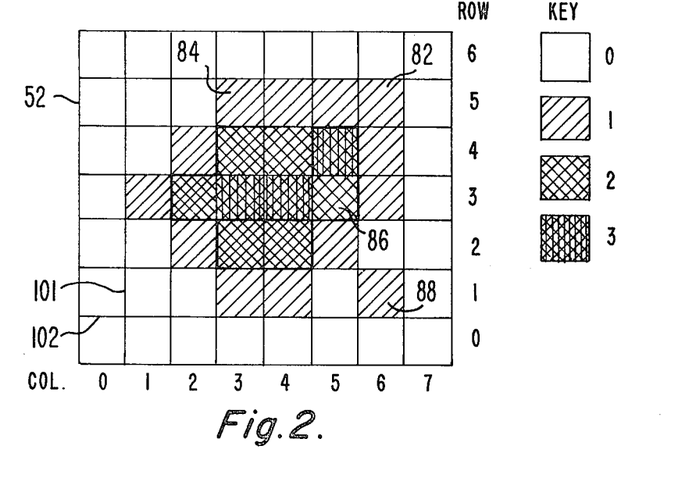
FIGS. 2 and 3 illustrate the display screen of FIG. 1 with an exemplary frame of information as it would appear respectively in the absence of the present invention and as a result of the present invention.

FIG. 2 illustrates a display screen 52 as it would appear in the absence of the resolution enhancement circuitry 80 (FIG. 1). A display consisting of 8 columns numbered 0-7 and seven rows numbered 0-6 for thereby providing for 56 display elements is illustrated.

A display element is defined as the smallest addressable area on the display screen. With the absence of circuitry 80 there is a direct correspondence between data cells in memory 20 and display elements on display screen 52. It should be understood that the regularly spaced vertical and horizontal lines such as 101 and 102 would not be present in an actual display and are shown for the purpose of the description.

The display on screen 52 illustrates a storm or rain cloud of increasing density towards its center surrounded by an area of no precipitation. The key at the right side of FIG. 2 represents the four different luminance levels possible with a two bit system. Key number zero represents a minimum density return or no precipitation which on an actual CRT appears dark. Key number 3 represents the most dense return of maximum precipitation which appears as the brightest portion on an actual CRT.

Figure 3:
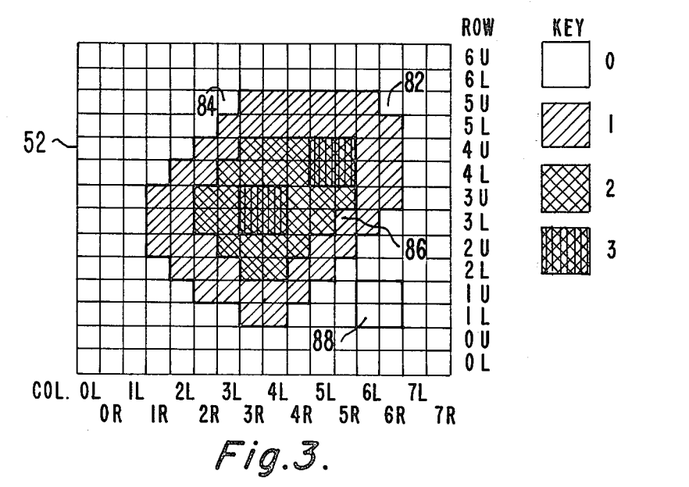

A comparison of FIG. 2 with FIG. 3, which also illustrates display screen 52 and utilizes the same data as in FIG. 2 but processed by the resolution enhancement circuitry within block 80, reveals a more visually pleasing display in FIG. 3. The more visually pleasing display in FIG. 3 exists because the number of columns and number of rows have each doubled relative to FIG. 2 resulting, it should be noted, in four times as many display elements. In FIG. 3 by way of example the designators 2L and 2R indicate column two left and column two right respectively while the designators 4U and 4L indicate row four, upper half and row four, lower half respectively. There is no special significance to the terms upper and lower, left and right. These terms are used merely for convenience of the description. Note that the value of portions of display elements such as 82, 84, 86 in FIG. 2 are altered to a different value as illustrated in FIG. 3. In FIG. 2 there is an anomalous level 1 cell 88 which is adjacent to data cells the levels of which are zeros. Such display elements likely result form noise in the system and are therefore undesirable. The circuitry within block 80, FIG. 1, according to the invention eliminates such a single cell by filling the cell with the level of surrounding cells. By comparing display element 88 at row one, column six, in FIG. 2 which is at luminance level one with the same row and column in FIG. 3 it will be seen that the four display element locations corresponding in FIG. 3 to data cell 88, FIG. 2, are of value zero.

The operation of FIG. 1 is as follows. Antenna 10 is assumed initially to be positioned to a given azimuth under control of TC 15. RT 12 under control of TC 15 which in turn is synchronized to column counter 68, causes a pulse to be emitted from antenna 10 at a time when counter 68 is at counts above 127 representing horizontal retrace time of CRT 50. At the same time, multiplexer 18 is set to a position opposite that shown such that terminals 18a and 18b are connected respectively to arms 18e and 18f. Signals reflected back to the antenna from the atmosphere at increasingly distant points from the antenna are processed in RT 12 and continuously converted by AD 13 to a series of multibit digital values representing atmospheric conditions at increasingly distant points. Since TC 15 controls the movement of antenna 10 it constantly tracks the angular position, theta, of the antenna. Further since TC 15 controls the timing of emitted radar pulses and since the turnaround time as a function of distance is fixed and known to TC 15, it tracks the distance, R, of returned signals. Therefore converter 16, under control of TC 15, generates row and column rectangular coordinate addresses for each of 128 successive range increments and causes a two bit signal at each range increment to be stored in the proper location in memory 20 replacing whatever information was therebefore stored. For purposes of discussion each stored two bit signal will be termed a data cell. When signals have been returned to antenna 10 for a time corresponding to a desired maximum range of interest as determined by the setting of switch 17, TC 15 emits a signal to antenna 10 to cause it to be moved to the next desired azimuth position. The process above described repeats when TC 15 receives the next pulse from column counter 68 indicating it has reached a count of 128 corresponding to the beginning of horizontal retrace on CRT 50.

As data cells are being stored in memory 20 at a relatively slow rate they are being read out at a relatively fast rate at terminal 20a in an entirely independent operation for purposes of creating display elements on viewing screen 52.

Figure 4A:
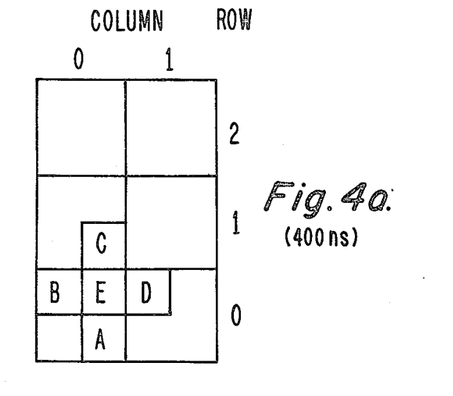
FIGS. 4a–4f are portions of the display screen of FIG. 1, each with an overlay showing how the values of six display elements are determined.

Readout of data cells is under control of row counter 64, column counter 68 and clock 60. As will be described hereinafter more fully, circuitry 80 creates the value of each display element from data cells presented at terminal 20a by considering the value of the data cell in the corresponding row and column and the value of the data cells in the row and column respectively immediately contiguous to the display element the value of which is being determined. Refer, for example, to FIG. 4a where the value of display element E is to be determined. Note that display element E is located in column 0, right side and row 0, upper half. Circuitry 80 functions to add the value of data cells corresponding to display elements A, B, C and D surrounding the value of display element E whose value is to be determined. To this sum is added to one and the total is divided by four. The value of display element E is the integer of this computation. In mathmatical terms the value of display element E equals integer $$[ \frac{A + B + C + D + 1}{4} ].$$

It will be noted that this computation amounts to adding twice the value of the data cell with which display element E is associated with, the values of the data cells immediately adjacent to display element E, then adding one and obtaining the integer of one fourth this value. The factor one is added to give desired bias to the value thus obtained, since the integer of the value obtained when dividing by four is used rather than rounding off the value so obtained. In some applications, for purposes of obtaining a more pleasing display on screen 42, it might be desirable to add the value 2 to the sum of A, B, C and D which would amount to rounding off the sum or it might be desirable to add no additional value. By adding twice the value of the data cell containing the display element, the value of which is to be determined to the value of adjacent data cells, the resulting average is weighted in favor of the data cell with which the computed display element is associated.

A detailed operation of circuit 80 and related circuitry of FIG. 1 is as follows. As initial conditions it wil be assumed that shift register 24 contains the 128 two bit data cells for column zero, that row counter 64 is at a count of zero, that column counter 68 is at a count of one and that toggle flop 72 is reset such that the Q terminal is at a logic zero. Therefore multiplexers 18 and 34 are positioned as shown. It also will be assumed the CRT beam is positioned at lower left hand corner of screen 52. As a result of the counts in counters 64 and 68 (zero and one respectively) the data cell for column one, row zero is made available at terminal 20a. The next logic 1 clock pulse from clock source 60, arbitrarily assumed to occur at time zero, enables each of registers 26 and 28 to receive one data cell and, via AND gate 23, advances all data cells in the shift register 24 by one position. Thereby the data cell from column zero, row zero is stored in register 26 and the data cell from column one, row zero is stored in register 28 and is stored in the trailing position of shift register 24. The same logic 1 clock pulse at time 0 also advances row counter 64 to a count of one.

Figure 4B:
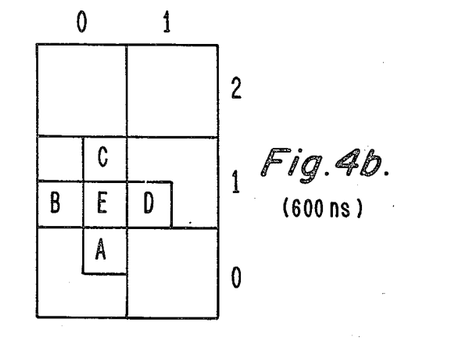
Figure 4C:
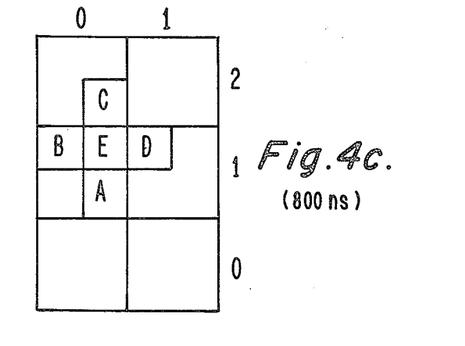
Figure 4D:
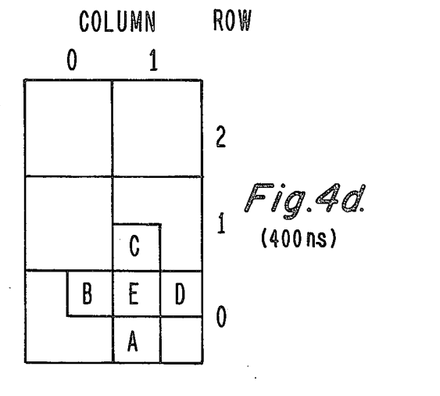
Figure 4E:
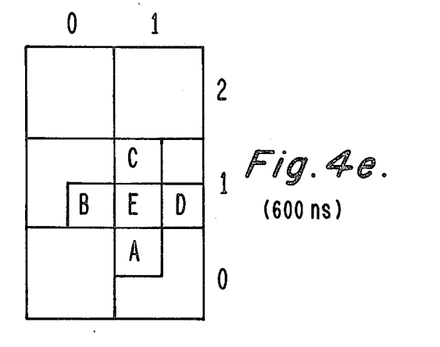
Figure 4F:
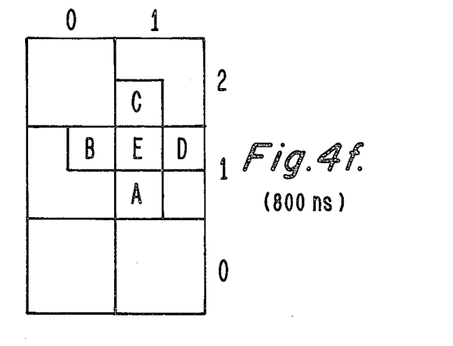
Figure 5A:
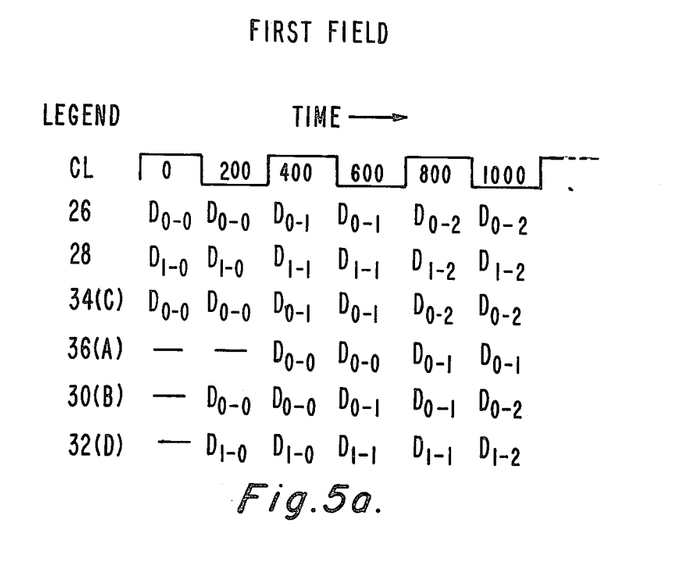
FIGS. 5a and 5b are tables depicting the information content of various registers in the apparatus of FIG. 1 at selected times during the generation of display elements for two scan lines.

The contents of registers 26 and 28 as well as the contents of register 30, 32, 36 and multiplexer contact 34c are diagrammatically illustrated in FIG. 5a to which attention is now directed. The legend in the left most column refers to reference numbers of elements in FIG. 1. Legend CL for example, refers to clock source 60 output CL. The waveforms are idealized clock pulses. The numbers such as 0, 200, 400 and so forth refer to times starting with an arbitrary time of zero relating to row zero. The letters A, B, C and D (in the left column) relate to the same letters in FIGS. 4a-4f and to similarly marked terminals in FIG. 1. The symbol $D_{X-Y}$ refers to a specific data cell in column, X, and row, Y. Therefore for example at time zero register 26 contains the value of the data cell for column zero, row zero while register 28 contains the contents data cell for column one, row zero as stated above. The dashed lines in certain rows of the time 0 and time 200 columns indicate that the contents of the affected registers are of no interest at this time. Hereinafter when the value of a specific data cell is referred to the designator $D_{X-Y}$ will be used.

When the CL signal from source 60 goes to logic zero at 200 nanoseconds and consequently the $\overline{CL}$ signal goes to logic one, registers 30 and 32 are thereby enabled to accept data from registers 26 and 28. See FIG. 5a, the column labeled 200, for the contents of the various registers. At 400 nanoseconds CL is again at logic one. As a result of the presence of the logic one CL signal, the value of data cell $D_{1-1}$ which has been present at terminal 20a is entered into register 28 and into shift register 24, the contents of which are shifted by one position. The value of data cell $D_{0-0}$ previously in register 26 is entered into enabled register 36. The value of data cell $D_{0-1}$ is entered into register 26. The row counter 64 is advanced by the logic 1 clock pulse of 400 ns to a count of two to make available at terminal 20a the value of data cell $D_{0-2}$.

As a result of the logic one CL pulse at 400 nanoseconds the various registers contain the values of the data cells illustrated in the column labeled 400 in FIG. 5a. By comparing the data cells, the values of which are contained in registers 30, 32, 36 and at multiplexer terminal 34c with FIG. 4a it will be noted that the values of the data cells associated with display elements A, B, C and D are being stored. These four values are added in adder 40. The value one is also added by virtue of the value 1 signal being applied to the CI terminal. The sum is effectively divided by four to obtain an average and the integer of the average is obtained by virtue of ignoring the $2^0$ and $2^1$ outputs. The resultant value of display element E which is one of 0, 1, 2 or 3 is applied to DA 42 to be converted to an appropriate analog value. The analog value is amplified by amplifier 44 and applied to the video terminal 50a of CRT 50 to be displayed on viewing screen 52 thereof as a spot of an appropriate level of brightness at a horizontal and vertical location thereon determined by the instantaneous value of signals applied by vertical and horizontal sweep circuits 66 and 70 respectively to deflection yoke 54 which is, in the example thus given, near the lower left hand corner of the screen. The particular point is that which corresponds to the right half of column 0 and the upper half of row 0.

Continuing with the example, at 600 nanoseconds the $\overline{CL}$ signal goes to a logic one which causes registers 30 and 32 to accept data cells $D_{0-1}$ and $D_{1-1}$ respectively. This corresponds to what is depicted in FIG. 4b. As described previously summing means 40 produces the value of the next data element E that is data element for row one, lower half.

The procedure above described continues until the value of each display element in column zero, right side has been determined and applied to CRT 50 to intensity modulate successive points along the sweep line corresponding to column zero, right side as Y or vertical sweep circuit 66 causes continuous movement of the CRT electron beam (not shown) to create the column zero, right side scan line. Ultimately counter 64 will reach a count of 128 at which time AND gate 23 will be blocked by the resulting logic 1 from the $2^7$ terminal of counter 64 which blocks further clock pulses from reaching shift register 24 to advance it and advances the count in counter 68 by one to a count of two. Shift register 24 at this time contains the value of 128 data cells from column 1. When counter 64 reaches a count of 128 the sweep of column D right on screen is complete and sync. generator 71 controlled by counter 64 issues commands to sweep circuit 66 to retrace back to the origin at the bottom of the screen 52 and issues commands to sweep circuit 70 to cause CRT 50 electron beam (not shown) to move into position to scan the portion of the screen corresponding to column 1, right side. Also during the retrace of the electron beam sync. generator 71 applies a disable pulse to amplifier 44 preventing intensity modulation of the electron beam.

While retrace of the electron beam is occurring CL signals continue to advance counter 64 to a count of 159 by which time the retrace is complete. Thereafter, at the leading edge of the next logic one CL signal, counter 64 will "advance" to a count of zero. In the manner above described the values for display elements in column 1, right side are determined as are display elements for columns 2-127.

Ultimately in this manner counter 68 will reach a count of 128 indicating that 128 sweep lines of one field have occurred. At this time the $2^7$ terminal of counter 68 becomes a logic 1 which shifts arms 18e and 18f of multiplexer 18 to terminals 18a and 18c respectively so that converter 16 controls the addressing of memory 20. The same logic 1 also is coupled to TC 15 to indicate that the display is about to go into a retrace mode during which time no information need be read from memory which is then free to accept information from AD 13. Accordingly TC 15 issues write commands to memory 20 on the read/write line to read in new information as previously described. While memory 20 is receiving new information CL pulses continue to cycle row counter 64 and thus indirectly advance column counter 68 in increments to a count of 146 or 147 then to a count of 0 at which time a pulse from the OF output terminal toggles toggle flop 72 to its alternate state which in the example being discussed is to the set state such that terminal Q is at a logic 1.

Figure 5B:
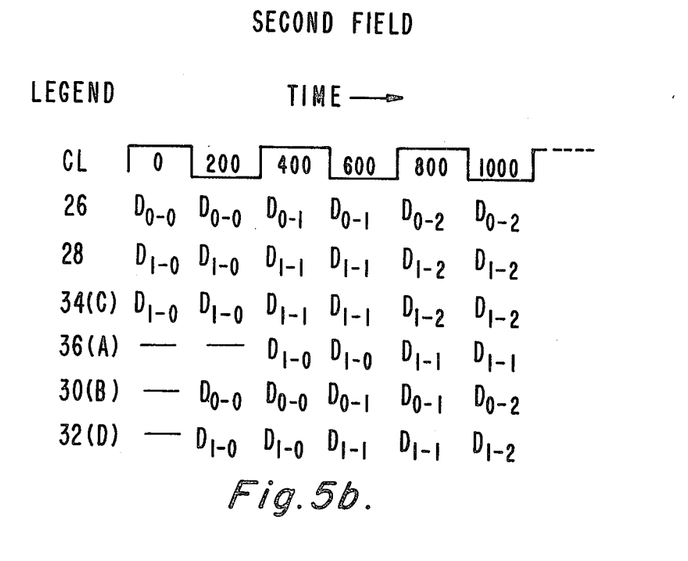

During the time that counter 68 is advancing from a count of 128 to its maximum count and then back to a count of 0 sync. generator 71 initiates a retrace of horizontal sweep circuit 70 back to the left side of screen 52 at an appropriate time such that vertical lines of this field are positioned between the corresponding lines of the previous field. With the Q terminal of toggle flop 72 at logic one, terminal 34c of multiplexer 34 is shifted to contact pole 34b. The result of this shift is illustrated in FIGS. 4d, 4e and 4f where three successive display elements E along the left side of column one are shown. FIG. 5b illustrates the value of the various registers in FIG. 1 at successive times during the generation of successive display elements for column 1 left side. Other columns of the second field are created in the same way as previously described.

It will be understood that although the apparatus of FIG. 1 cannot properly generate display elements for extreme left and right sweep lines and extreme top and bottom rows additional logic permits this in practice.

Figure 6:
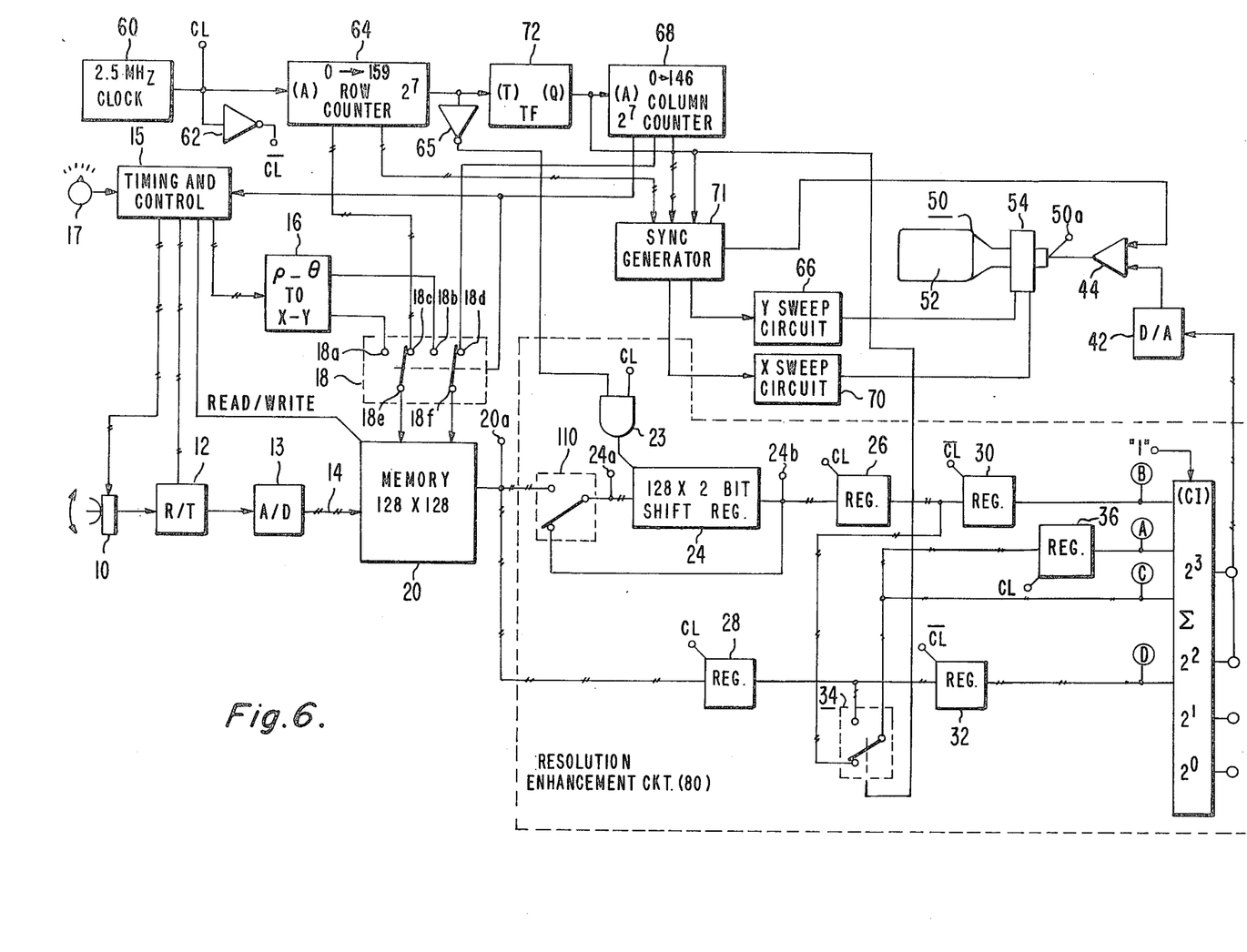
FIG. 6 is a schematic diagram of a modified form of the digital weather radar shown in FIG. 1 wherein a frame of information is created without interlace.

FIG. 6 is similar to FIG. 1 except that the various elements have been arranged so that there is no interlacing of sweep lines, rather sweep lines zero left, zero right, one left, one right, two left, etc. are created in order. In FIG. 6, where elements similar to those in FIG. 1 are similarly numbered, the $2^7$ output of counter 64 is coupled to the T input terminal of toggle flop 72 rather than to the advance terminal of counter 68. The Q output terminal of toggle flop 72 is coupled to control a multiplexer 110 interposed between memory terminal 20a and the input and output terminals 24a and 24b respectively of shift register 24. The Q output terminal of toggle flop 72 is also coupled to the A terminal of column counter 68. The Q terminal is not coupled to a sync. generator 71 as was done in FIG. 1 nor to control the maximum count in counter 68 which in the circuit of FIG. 6 always counts to a count of 146 before returning to a count of 0 upon the next logic 1 going signal from the Q terminal of toggle flop 72. The OF terminal of counter 68 is not utilized. In all other respects FIGS. 1 and 6 are identical.

Operation of the system of FIG. 6 is similar to that of FIG. 1 except that column counter 68 only advances on the leading logic 1 going edge of toggle flop 72 Q output terminal which occurs only every other time row counter 64 is "advanced" from a count of 127 to a count of 128. Also for every other scan line of display elements to be created data comes, not directly from memory 20, but rather from shift register 24 connected in recirculating fashion by means of multiplexer 110 being electronically coupled as illustrated in FIG. 6. The value of each display element is computed in summing means 40 just as described in connection with FIG. 1. When the last sweep line occurs in a frame of information on screen 52, sync. generator 71 causes horizontal retrace of the electron beam in CRT 50 back to the position of the first sweep line.

Figure 7:
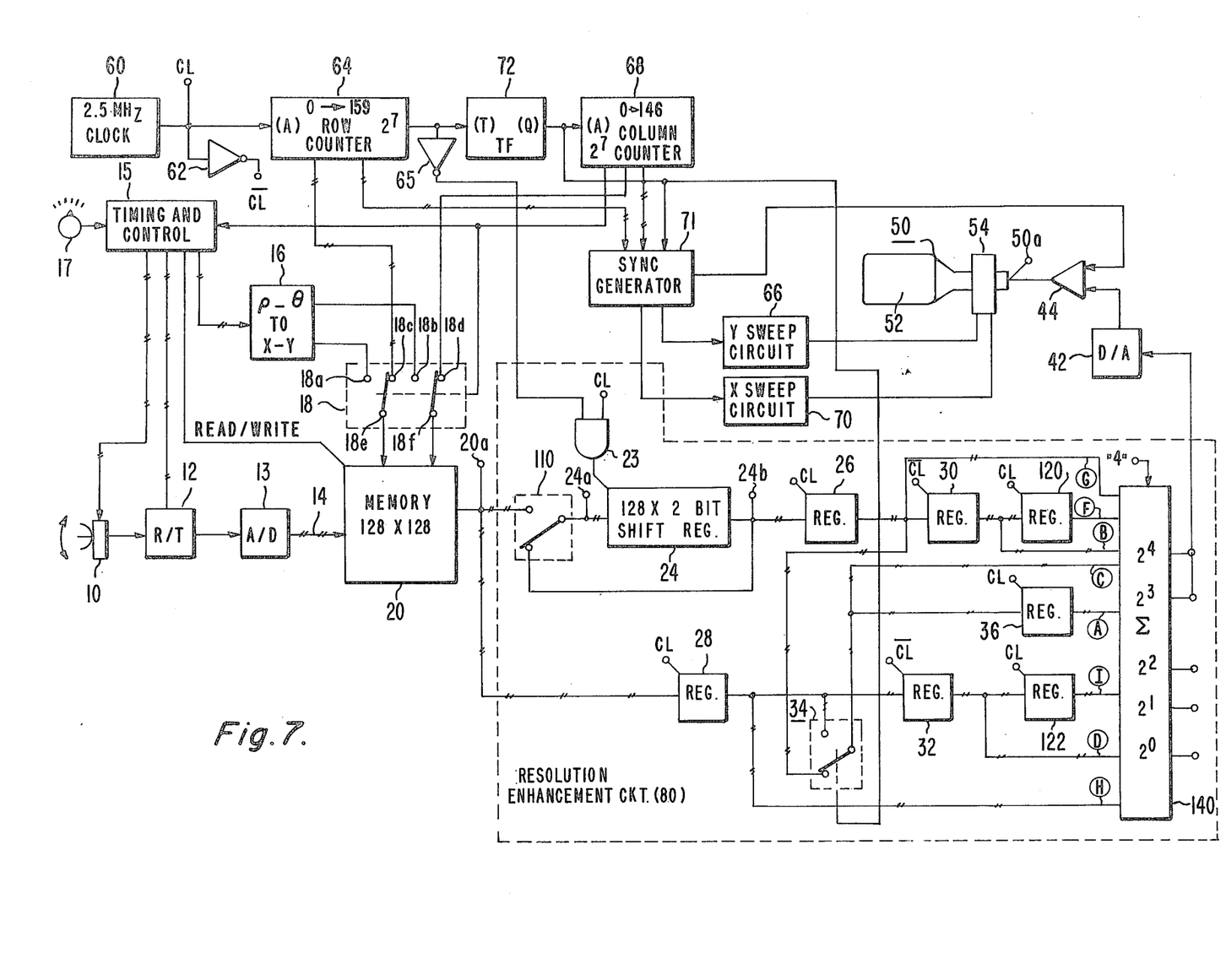
FIG. 7 is a schematic diagram of another modified form of digital weather radar display similar to that of FIG. 6 wherein a frame of information is created without interlace and in which each display element is created from the values of eight surrounding display elements.

FIG. 7 illustrates yet another version of a digital weather radar embodying the present invention which is similar to the circuit of FIG. 6 in that there is no field interlace but is distinguished by the averaging of 8 elements surrounding the display element the value of which is being determined. It will be remembered that in FIGS. 1 and 6 only 4 elements are averaged, two from the data cell with which the display element is associated and one each from horizontal and vertically contiguous data cells thus weighting the average toward the value of the data cell with which the display element is associated. FIG. 7 is identical in construction to FIG. 6 except that a five stage summing means 140 is provided and two additional single stage shift registers 120 and 122 are provided. In addition to the connections to summing means 140 that are similar to those in FIGS. 1 and 6 there are additional connections from registers 26 and 28 at terminals respectively. Registers 30 and 32 are coupled to newly added registers 120 and 122 respectively, the output terminals of which are connected to terminals F and I respectively of summing means 140. CL signals are applied to the appropriate terminals of registers 120 and 122. The value 4 is carried into summing means 40 at the CI terminal. The three least significant output terminals of summing means 140, namely $2^0$, $2^1$ and $2^2$ are not utilized which is the equivalent of dividing by 8. The two most significant output terminals of summing means 140, namely $2^3$ and $2^4$ are coupled to DA 42 providing it with values 0, 1, 2 or 3 as in FIGS. 1 and 6.

Operation of the circuit of FIG. 7 is similar to that of FIG. 6 except that when summing means 140 is operational it adds the value 4 and the values of the 8 elements surrounding display element E rather than adding the value 1 to the value of the four elements surrounding display element E as in the system of FIGS. 1 and 6. By adding a fixed value 4 and by ignoring the three least significant outputs from summing means 140 the value of the 8 inputs are averaged and rounded to the nearest integer.

Figure 8A:
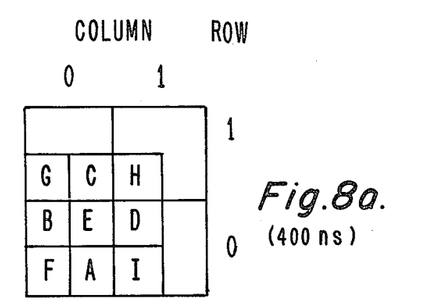
FIGS. 8a–8d are portions of the display screen of FIG. 7 each with an overlay showing how the values of four display elements are determined.
Figure 8B:
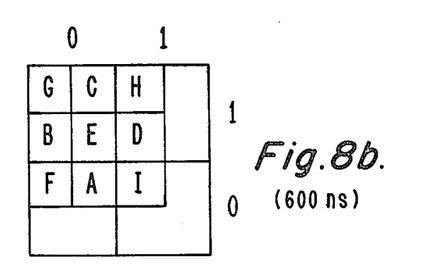
Figure 8C:
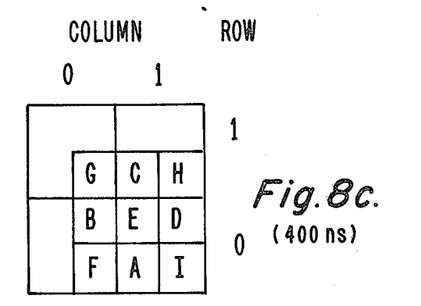
Figure 8D:
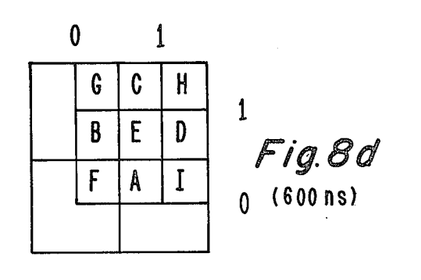

FIGS. 8a and 8b illustrate how the value of two successive display elements for column 0, right side, are determined while FIGS. 8c and 8d illustrate how the value of two display elements for column 1, left side are determined.

It will be realized that the weather radar illustrated in FIGS. 1, 6 and 7 is only one exemplary embodiment in which the instant invention may be utilized. It will be further realized that by what means data becomes stored in memory 20 is of no particular consequence in the practice of the invention which provides an apparent increased resolution of data as displayed relative to data as stored. It will be further realized that the invention does not require any memory such as memory 20 but rather the input to terminal 20a may be in real time. It will be further realized that the terms row and column refer only to orthogonal lines of information. A row may for example, lie horizontal, in which case a column lies vertical. Alternatively, a row may, for example, lie vertical in which case a column lies horizontal.

What is claimed is:

1. In an apparatus for displaying, in response to digitized signals representing data cells, variable intensity display elements in a matrix of rows and columns, said signals representing data cells derived from a data image defined by a matrix of rows and columns of said data cells, each cell having a discrete value of a plurality greater than 2 of values, comprising in combination:

means generating a first signal representing the value of a particular one of said data cells, and second signals representing respectively the values of selected ones of data cells adjacent said one particular data cell, means responsive to said first signal and said second signals for generating a third signal which is the average of $n$ times the value of said one particular data cell and not greater than $n$-1 times the value of each of said adjacent selected data cells, where $n$ is one of the number 2 and 3 equal to the number of said selected adjacent data cells; and display means responsive to said third signal for intensity modulating the display surface thereof at an intensity corresponding to the value of said third signal.

2. The combination as set forth in claim 1 wherein said display means is responsive to deflection signals for positioning the location of said intensity modulation on said display surface and further including means responsive to row and column locations of said one particular data cell and of said adjacent data cells for providing deflection signals to position the location of said intensity modulation on said display screen.

3. The combination as set forth in claim 1 wherein said means generating said second signals generates signals representing the value of only one adjacent data cell in the same row as said particular one of said data cells and generates signals representing the value of only one adjacent data cell in the same column as said particular one of said data cells.

4. The combination as set forth in claim 1 wherein said means generating said second signal generates signals representing the value of only one adjacent data cell in the same row as said particular one of said data cells and generates signals representing the value of only one adjacent data cell in the same column as said particular one of said data cells and generates signals representing the value of the one additional data cell which is adjacent to and in the same column as said row adjacent data cell and is adjacent to and in the same row and said column adjacent data cell and wherein said third signal generating means includes means for generating said third signal which is the average of three times the value of said one particular data cell and two times the value of each said adjacent row and adjacent column data cells and the value of said one additional data cell.

5. The combination as set forth in claim 1 wherein said display means is a cathode ray tube which is modulatable to produce variable intensity luminance of various portions of the display screen thereat in response to the time value of said third signal and wherein said means generating said third signal generates said third signal for successive particular ones of said data cells in said matrix which third signal causes modulation of the display screen of said cathode ray tube at various points thereof producing a matrix of rows and columns of said display elements.

6. The combination as set forth in claim 1 further including a weather radar receiver and transmitter, an antenna coupled thereto for receiving atmospheric data in analog form, an analog to digital converter coupled to said receiver and transmitter for converting said analog data therefrom to digital data and a memory coupled to said analog to digital converter arranged for storing said antenna data as said rows and columns of data cells.

7. The combination as set forth in claim 1 wherein said means generating said first and second signals includes storage means storing the value of all of said rows and columns of said data cells and responsive to addressing signals for producing seriatum at an output terminal signals representing said data cells.

8. The combination as set forth in claim 7 wherein said means generating said first and second signals includes temporary storage means storing values of a number of data cells equal to the number of rows thereof in said matrix of data cells, and wherein said means responsive to said first and second signals is responsive to signals from said memory for one of the values of data cells in the column of said particular one of said data cells and the column of an adjacent data cell in an adjacent column, and is responsive to said temporary storage means for the other of the values of data cells in the column of said particular one of said data cells and the column of an adjacent data cell in an adjacent column.

9. The combination as set forth in claim 8 wherein said means generating said third signal comprises a summing means responsive to said first and second signals to provide a third signal representing a digital number which is the integer of the average of values of data cells represented by said first and second signals.

10. A method for increasing the resolution of a system for displaying images, said images being stored as a data image comprising a matrix of rows and columns of data cells, each cell being one of a fixed plurality of discrete values and each representing an area of the physical image to be displayed, comprising the steps of:

(a) computing the averages of $n$ times the value of each said data cell and one of each of the four combinations of the value of only one adjacent row data cell and only one adjacent column data cell and each of the four combinations of twice the value of a data cell in the same row as and adjacent each said data cell, twice the value of a data cell in the same column as and adjacent each said data cell and the value of a data cell which is in the same column as said adjacent row data cell and same row as said adjacent column data cell, where $n$ equals the number of adjacent data cells utilized to compute the average;

(b) partitioning each of said areas of said physical image representing each data cell into four quadrantal sections, each having an edge adjacent an area represented by an adjacent column data cell and an edge adjacent an area represented by an adjacent row data cell; and (c) displaying each of said four quadrantal sections of said areas of said physical image as a function of said average value computed with said adjacent row and column data cells representing areas of physical image adjacent respective row and column edges of said each quadrantal section.

* * * * *

UNITED STATES PATENT AND TRADEMARK OFFICE
CERTIFICATE OF CORRECTION

PATENT NO. : 4,127,873
DATED : November 28, 1978
INVENTOR(S) : Kazuo Katagi

It is certified that error appears in the above-identified patent and that said Letters Patent is hereby corrected as shown below:

Column 3, line 64, after "single" insert --data--;

Column 4, line 9, "$2^2$" should be --$2^1$--;

Column 4, line 67, "27" should be --$2^7$--;

Column 4, line 67, "terminals" should be --terminal--;

Column 7, line 36, delete "to" (second occurrence);

Column 7, line 62, "wil" should be --will--;

Column 11, line 9, after "terminals" insert --G and H--.

Signed and Sealed this

First Day of May 1979

[SEAL]

Attest:

RUTH C. MASON
Attesting Officer

DONALD W. BANNER
Commissioner of Patents and Trademarks